US011667319B2

(12) United States Patent
Yang et al.

(10) Patent No.: US 11,667,319 B2
(45) Date of Patent: Jun. 6, 2023

(54) STEERING WHEEL, STEERING WHEEL VIBRATION PROMPT SYSTEM AND VEHICLE COMPRISING SAME

(71) Applicant: AAC Acousitc Technologies (Shanghai)Co., Ltd., Shanghai (CN)

(72) Inventors: Zhicheng Yang, Shenzhen (CN); Xiang Ding, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 0 days.

(21) Appl. No.: 17/533,148

(22) Filed: Nov. 23, 2021

(65) Prior Publication Data

US 2022/0161839 A1  May 26, 2022

(30) Foreign Application Priority Data

Nov. 23, 2020  (CN) .......................... 202022737349.7

(51) Int. Cl.
*B62D 1/04* (2006.01)
*B60W 50/16* (2020.01)
*B62D 1/06* (2006.01)

(52) U.S. Cl.
CPC ............. *B62D 1/046* (2013.01); *B60W 50/16* (2013.01); *B62D 1/06* (2013.01)

(58) Field of Classification Search
None
See application file for complete search history.

(56) References Cited

U.S. PATENT DOCUMENTS

| 10,167,017 B2* | 1/2019 | Haba ......................... B62D 1/06 |
| 2011/0133919 A1* | 6/2011 | Evarts ..................... B62D 1/046 340/439 |
| 2019/0275935 A1* | 9/2019 | Lisseman ................. B62D 1/06 |

* cited by examiner

*Primary Examiner* — Vicky A Johnson
(74) *Attorney, Agent, or Firm* — W&G Law Group

(57) ABSTRACT

The present disclosure relates to a steering wheel, a steering wheel vibration prompt system and a vehicle incorporating such a steering wheel. The steering wheel includes a steering wheel body, a flexible support member, a vibration member and a vibrator. The steering wheel body is provided with an accommodation space. The vibration member is connected to the flexible support member and is suspended and supported on the steering wheel body by the flexible support member. The vibrator is connected to the vibration member and drives the vibration member to vibrate. The vibrator of the steering wheel and the sensor device cooperate with each other, and the vibrator performs a vibration action according to the output signal of the sensor device, and then drives the vibration member to perform corresponding vibration actions.

9 Claims, 3 Drawing Sheets

STEERING WHEEL, STEERING WHEEL VIBRATION PROMPT SYSTEM AND VEHICLE COMPRISING SAME

TECHNICAL FIELD

The present disclosure relates to a vehicle, in particular to a steering wheel, a steering wheel vibration prompt system applied in a vehicle.

BACKGROUND ART

With the development of cars in the direction of intelligence, the control mode of the on-board system has gradually changed from traditional mechanical buttons to touch control, voice control, and gesture control to enhance the user experience. The transformed control method is provided with increased the interaction between people and vehicles, and more and more functional modules are integrated in the vehicle. The user's driving experience is improved, and at the same time, it also brings driving safety hazards and reduces driving safety.

BRIEF DESCRIPTION OF DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF EMBODIMENTS

Figure 1:
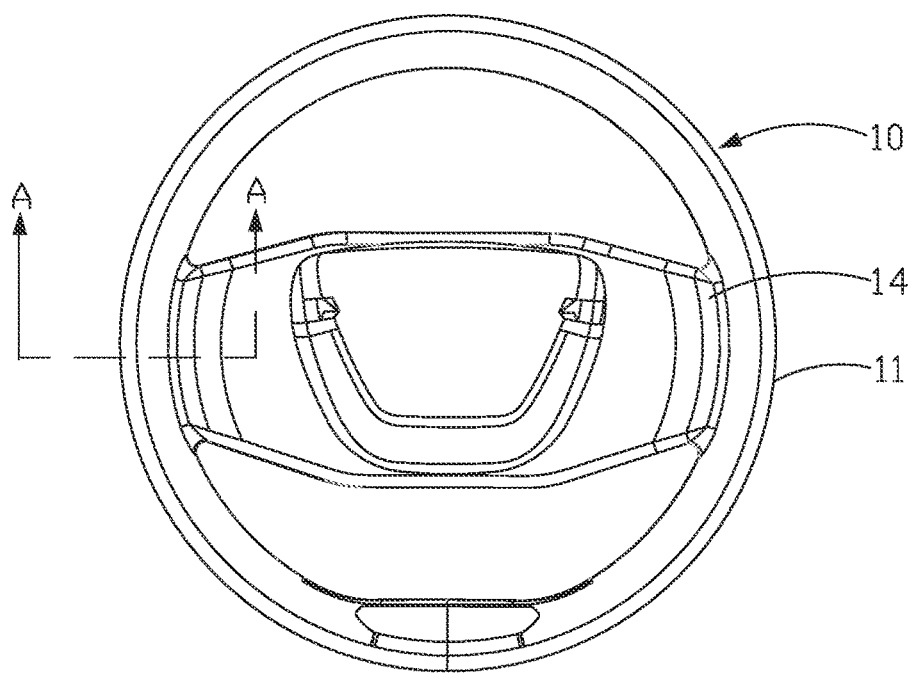
FIG. 1 is a schematic structural view of a steering wheel in accordance with an exemplary embodiment of the present disclosure.
Figure 2:
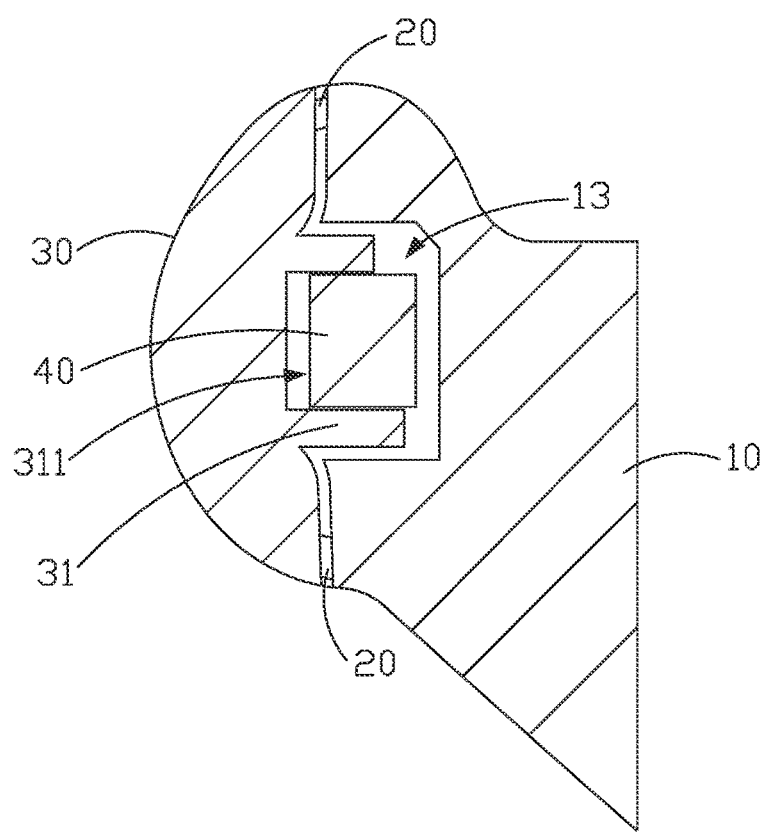
FIG. 2 is a cross-sectional view of the steering wheel shown in FIG. 1 taken along line AA.
Figure 3:
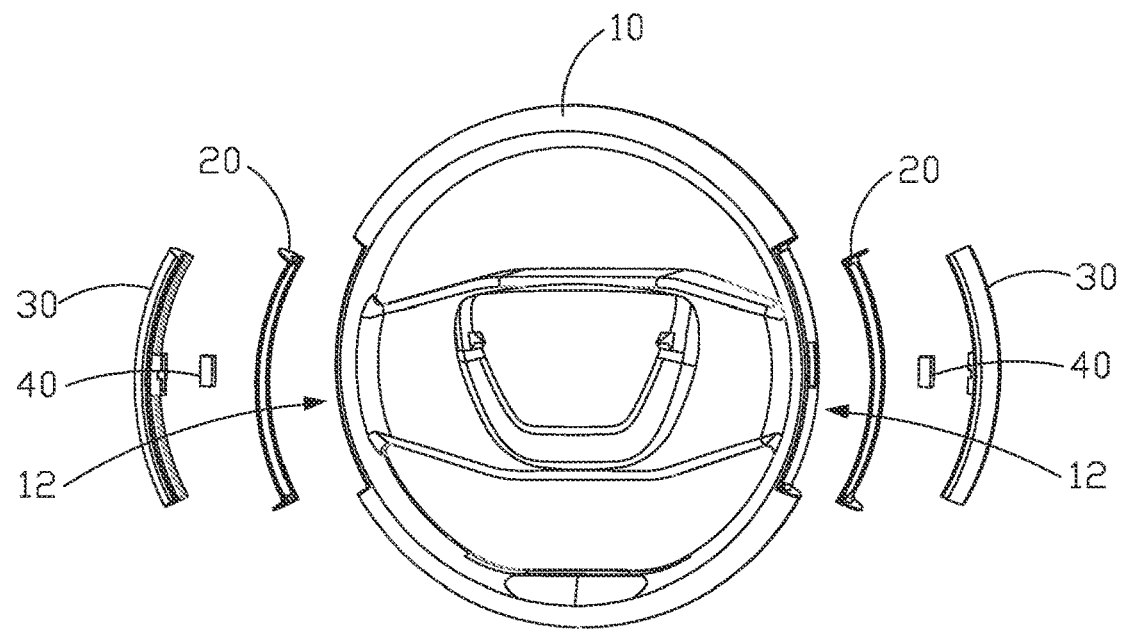
FIG. 3 is an exploded view of the steering wheel shown in FIG. 1.

Referring to FIGS. 1-3, FIG. 1 shows a schematic structural view of a steering wheel of an embodiment of the present disclosure, FIG. 2 shows a cross-sectional view of the steering wheel shown in FIG. 1 along AA, and FIG. 3 shows the exploded view of the structure of the steering wheel shown in FIG. 1. The steering wheel provided by an embodiment of the present disclosure comprises a steering wheel body 10, a flexible support member 20, a vibration member 30 and a vibrator 40. The steering wheel body 10 is movably connected with the vehicle. The steering wheel body 10 is provided with an accommodation space. The flexible support member 20 is accommodated and fixed in the accommodation space. The vibration member 30 is connected to the flexible support member 20 and is suspended and supported on the steering wheel body 10 by the flexible support member 20. The vibrator 40 is connected to the vibration member 30 and drives the vibration member 30 to vibrate.

The above-mentioned steering wheel and vibration member 30 are installed on the steering wheel body 10 through the flexible support member 20 to form a suspension structure. The vibrator 40 is connected to the vibration member 30, and the vibration drive is provided through the vibrator 40. When in use, the vibrator 40 and sensor device 50 of the steering wheel cooperate with each other. The vibrator 40 performs a vibration action according to the output signal of the sensor device 50, and then drives the vibration member 30 to do a corresponding vibration action. When the driver holds the steering wheel, tactile feedback is generated to remind or warn the driver. This can help the driver eliminate driving safety hazards and shorten the reaction time, thereby improving driving safety.

In one embodiment, the vibrator 40 is a vibration motor with at least two different vibration modes. Specifically, the vibration mode comprises vibration intensity, vibration frequency, and the like. In this way, the vibration motor can provide tactile feedback with different vibration intensities or different vibration frequencies according to the different output signals of the sensor device 50. It is used to distinguish different reminders or warnings to remind the driver of the current danger level and improve driving safety. Of course, in other embodiments, the vibrator 40 can also be other devices with a vibration function.

Figure 4:
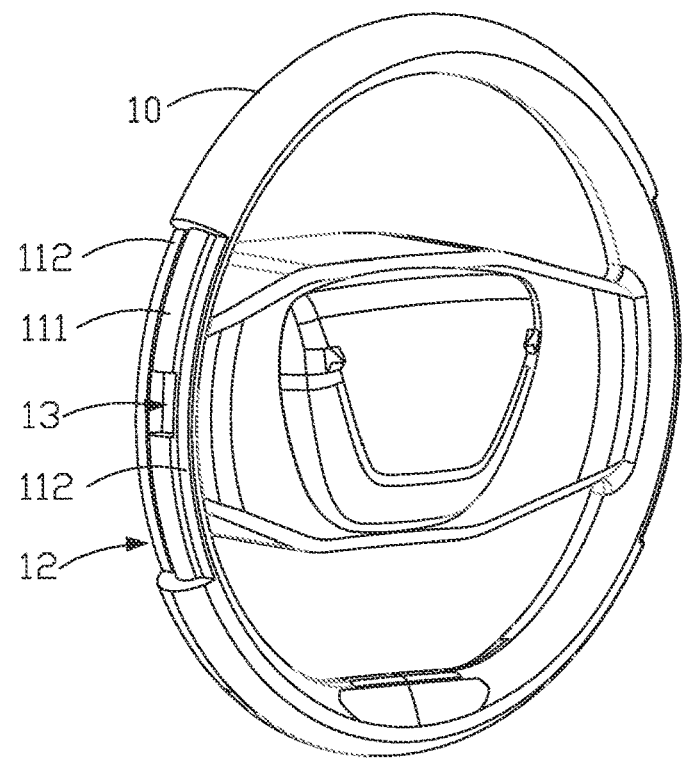
FIG. 4 is a schematic structural view of a steering wheel body of the steering wheel.

In one embodiment, refer to FIGS. 1, 3-4, FIG. 4 shows the schematic structural view of the steering wheel body shown in FIG. 1. The steering wheel body 10 comprises a support part 14 and a gripping part 11 connected to the support part 14. The gripping part 11 is provided with an accommodation space, and the vibration member 30 is arranged in the gripping part 11. In this way, set the vibration member 30 in the gripping part 11. When the driver is driving, the vibration generated by the vibrator 40 can be more effectively transmitted to the driver's hand, so that the driver's hand can perceive obvious tactile feedback. The purpose of reminding or warning the driver is achieved, thereby improving driving safety.

In one embodiment, referring to FIGS. 1 and 3, the gripping part 11 is arranged around the support part 14, and at least two vibration members 30 are symmetrically arranged on opposite sides of the gripping part 11. The flexible support member 20, the vibration member 30 and vibrator 40 are set one by one. In this way, at least two vibration members 30 can generate vibration, so that the vibrator 40 of different gripping parts 11 can be activated according to the environmental information collected by the sensor device 50. This can flexibly perform vibration actions, remind or warn the driver, and ensure driving safety.

Further, the vibrator 40 located on different sides of the gripping part 11 are independent of each other. It can be understood that the vibration control signals of the vibrator 40 located in different gripping parts 11 are independent of each other. In this way, the vibration feedbacks of the vibration members 30 of different gripping parts 11 are also independent of each other, and this independent vibration tactile feedback can distinguish the directions of reminders or warnings.

Specifically, the control device 60 can individually control the vibrator 40 of different gripping parts 11 to perform a vibration action, and drive the vibration member 30 of different gripping parts 11 to generate vibration. Alternatively, the control device 60 can also individually control the vibrator 40 of one of the gripping part 11 to perform a vibration action, and drive the vibration member 30 of the gripping part 11 to produce vibration. Alternatively, the control device 60 controls the vibrator 40 of different gripping parts 11 to perform vibration actions at the same time, and the vibrators 40 of different gripping parts 11 generate different vibration intensities or frequencies.

In one embodiment, referring again to FIGS. 1, 3-4, a concave part 12 is formed on the side of the gripping part 11 away from the support part 14 by sinking toward the support part 14. The vibration member 30 is embedded in the concave part 12. The vibrator 40 and the flexible support member 20 are accommodated in the concave part 12 and sandwiched between the vibration member 30 and the gripping part 11. The outer surface of the vibration member 30 and the outer surface of the steering wheel body 10 smoothly transition. In this way, the vibrator 40 and flexible support member 20 can be hidden. At the same time, it is also convenient for the driver to control the steering wheel, making the steering wheel control smoother.

Further, referring to FIGS. 3-4, the gripping part 11 comprises an arched part 111 protruding from and arranged in the concave part 12 and a flat part 112 located on opposite sides of the arched part 111. The arched part 111 and the flat part 112 extend along the circumferential direction of the steering wheel body 10. The flexible support member 20 is sandwiched between the flat part 112 and vibration member 30. The arched part 111 sinks toward the direction away from the vibration member 30 to form a groove 13 for accommodating the vibrator 40. It can be understood that the arched part 111 protrudes outward in the radial direction of the steering wheel body 10 relative to the flat part 112. During installation, the side of the vibration member 30 facing the concave part 12 abuts against the flat part 112 through the flexible support member 20. Since the gripping part 11 comprises the arched part 111, the arched part 111 can act as a limiter and prevent the vibration member 30 from sliding radially under the action of external force. Thus, the vibration member 30 can be stably installed on the steering wheel body 10.

In one embodiment, referring to FIG. 2 and FIG. 4, the vibration member 30 is provided with a protruding bump 31 protruding toward the groove 13. The protruding bump 31 is provided with an installation slot 311, and the vibrator 40 is fixed in the installation slot 311 and suspended in the groove 13. In this way, it is convenient for the vibrator 40 to be hidden and installed inside the steering wheel body 10.

Further, referring to FIG. 2, a gap is arranged between the trough wall of the groove 13 and the protruding bump 31 with the outer surfaces of the vibrator 40. It is understandable that if the vibrator 40 is installed in the installation slot 311, part of the structure of the vibrator 40 is located outside the installation slot 311. Then the vibrator 40 is located outside the installation slot 311 and a gap is arranged between the outer surface of the protruding bump 31 and the trough wall of the groove 13. If all the vibrator 40 are located in the installation slot 311, a gap is arranged between the outer surface of the protruding bump 31 and the trough wall of the groove 13. In this way, the protruding bump 31 and the steering wheel body 10 are not directly connected, and the vibration generated by the vibrator 40 is prevented from being directly transmitted to the steering wheel body 10 through the protruding bump 31. In this way, it is possible to avoid the reduction of the amplitude caused by the weakening of the vibration energy during the conduction process, thereby ensuring that the vibration feeling of the vibration member 30 can be sensed by human hands.

In one embodiment, referring to FIG. 2, the protruding bump 31 is a vibration body, and the vibration body is provided with an installation slot 311. The vibrator 40 is fixed in the installation slot 311. Optionally, the vibration body is a metal body. In this way, when the vibrator 40 performs a vibration action, the vibration is transmitted to the vibration body, and the vibration feeling is enlarged by the vibration body, so that the vibration feeling of the vibration member 30 is strong. That is, obvious tactile feedback is produced to remind or warn the driver. This can help the driver eliminate driving safety hazards and shorten the reaction time, thereby improving driving safety.

In one embodiment, the flexible support member 20 is a flexible material body, such as a special solid glue, a rubber pad, and the like. Of course, the flexible support member 20 may also be a spring system or other structure capable of providing a suspension system.

Figure 5:
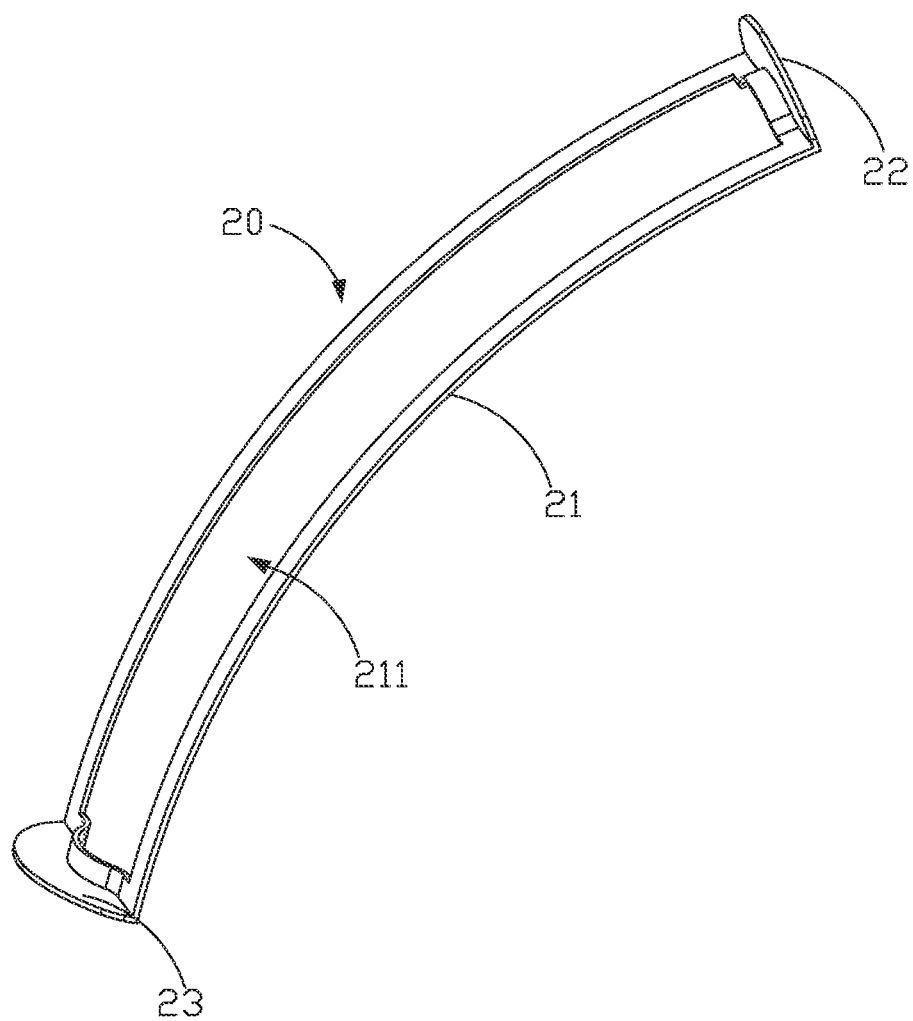
FIG. 5 is a schematic structural view of a flexible support member of the steering wheel in FIG. 3.

For example, in this embodiment, referring to FIGS. 3 and 5, FIG. 5 shows the schematic structural view of the flexible support member 20. The flexible support member 20 comprises a first support part 21 that is set relative and spaced apart, a second support part 22 and a third support part 23 that are located at both ends of first support part 21 respectively. The first support part 21 is attached to the flat part 112, and the second support part 22 and the third support part 23 are respectively sandwiched between the arched part 111 and the vibration member 30 and attached to both ends of the vibration member 30. In this way, the vibration member 30 is installed on the steering wheel body 10 through the first support part 21, the second support part 22 and the third support part 23 to form a suspension structure.

Specifically, in this embodiment, the first support part 21 is provided with a strip hole 211. The strip hole 211 extends along the circumferential direction of the steering wheel body 10. During installation, the arched part 111 of the steering wheel body 10 can pass through the strip hole 211 to facilitate the installation of the vibration member 30.

Figure 6:
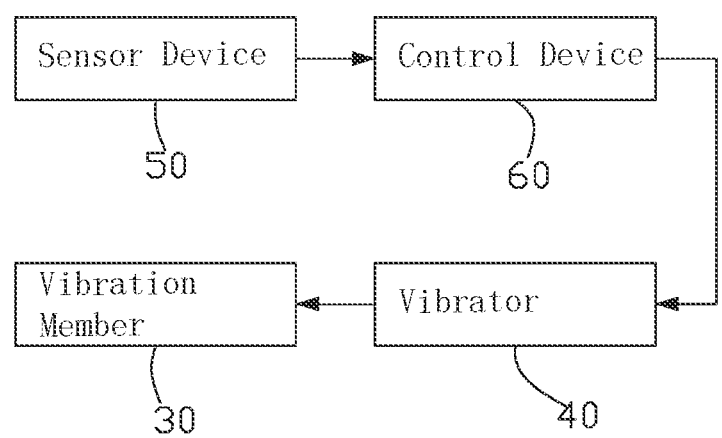
FIG. 6 is an electrical block diagram of a steering wheel prompt system incorporating the steering wheel in FIG. 1.

Refer to FIG. 6, which shows a electric block diagram of a steering wheel vibration prompt system according to an embodiment of the present disclosure. The steering wheel vibration prompt system provided by the present disclosure comprises a sensor device 50, a control device 60 and the steering wheel of any one of the above embodiments. The sensor device 50 is used to collect environmental information. The control device 60 is electrically connected to the sensor device 50 and the vibrator 40, respectively, and follows environmental information and drives the vibrator 40.

Specifically, the output terminal of the sensor device 50 is electrically connected to the input terminal of the control device 60, and is used to feed back environmental collection information to the control device 60. The output end of the control device 60 is electrically connected to the vibrator 40, and is used to control the vibrator 40 to perform corresponding vibration actions.

In the above-mentioned steering wheel vibration prompt system, the vibration member 30 is installed on the steering wheel body 10 through the flexible support member 20 to form a suspension structure. The vibrator 40 is connected to the vibration member 30, and the vibrator 40 provides vibration drive. When in use, the vibrator 40 of the steering wheel and the sensor device 50 cooperate with each other. The vibrator 40 performs a vibration action according to the output signal of the sensor device 50, and then drives the vibration member 30 to also perform a corresponding vibration action. When the driver holds the steering wheel, it will produce obvious tactile feedback to remind or warn the driver. This can help the driver eliminate driving safety hazards and shorten the reaction time, thereby improving driving safety.

In one embodiment, the application scenario of the steering wheel vibration prompt system comprises at least one of overspeed warning, navigation reminder, reversing reminder, parking and storage reminder, vehicle pedestrian collision warning, lane departure warning, and fatigue driving warning. For example, when the directional vibration prompt system is applied to overspeed warning, the environmental information collected by sensor device 50 comprises the current speed of the vehicle, and feeds back the current speed to the control device 60, and the control device 60 determines whether the current speed exceeds the preset speed. If the current speed exceeds the preset speed, the pre-warning condition is met, and the vibrator 40 is started to perform a vibration action to remind the driver. For another example, when the directional vibration prompt system is applied to vehicle pedestrian collision warning, the environmental information collected by sensor device 50 comprises current distance between the vehicle and pedestrian, and the current distance is fed back to the control device 60, and the control device 60 determines whether the current distance exceeds the preset distance. If the current distance exceeds the preset distance, the pre-warning condition is met, and the vibrator 40 is started to perform a vibration action to remind the driver. The above application scenarios are not detailed here.

The vehicle provided by the present disclosure comprises a vehicle body and the steering wheel vibration prompt system of any one of the above-mentioned embodiments.

In the above-mentioned vehicle, the vibration member 30 is installed on the steering wheel body 10 through the flexible support member 20 to form a suspension structure. The vibrator 40 is connected to the vibration member 30, and the vibration drive is provided through the vibrator 40. When in use, the vibrator 40 of the steering wheel and the sensor device 50 cooperate with each other, and the vibrator 40 performs a vibration action according to the output signal of the sensor device 50, and then drives the vibration member 30 to also perform corresponding vibration actions. When the driver holds the steering wheel, it will produce obvious tactile feedback to remind or warn the driver. This can help the driver eliminate driving safety hazards and shorten the reaction time, thereby improving driving safety.

In the description of the present disclosure, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial" the direction or positional relationship indicated by "," "radial", "circumferential", etc. are based on the direction or positional relationship shown in the drawings. It is only for the convenience of describing and simplifying the description of the present disclosure, rather than indicating or implying that the device or element referred to must have a specific direction, be constructed and operated in a specific direction, and therefore cannot be understood as a limitation of the present disclosure.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "a plurality of" means at least two, such as two, three, etc., unless otherwise specifically defined.

In the present disclosure, the terms "installation", "connected", "connected", "fixed" and other terms should be understood in a broad sense unless otherwise clearly defined and limited. For example, it can be a fixed connection, a detachable connection, or a whole. It can be a mechanical connection or an electrical connection. It can be directly connected or indirectly connected through an intermediary. It may be the internal communication between two elements or the interaction relationship between the two elements, unless specifically defined otherwise. For those of ordinary skill in the art, the specific meaning of the above-mentioned terms in the present disclosure can be understood according to specific circumstances.

In the present disclosure, unless otherwise clearly defined, the first feature "on" or "under" the second feature may be in direct contact with the first and second features, or the first and second features may be through an intermediary. Indirect contact. Moreover, the "above", "above" and "above" of the first feature on the second feature may mean that the first feature is directly above or obliquely above the second feature, or it simply means that the level of the first feature is higher than the second feature. The first feature "below", "below" and "below" the second feature can mean that the first feature is directly below or obliquely below the second feature, or it simply means that the level of the first feature is smaller than the second feature.

It should be noted that when an element is referred to as being "fixed to" or "arranged on" another element, it can be directly on the other element or a central element may also be present. When an element is considered to be "connected" to another element, it can be directly connected to the other element or an central element may be present at the same time. The terms "vertical", "horizontal", "upper", "lower", "left", "right" and similar expressions used herein are for illustrative purposes only and do not mean the unique implementation.

The various technical features of the above-mentioned embodiments can be combined arbitrarily. In order to make the description concise, all possible combinations of the various technical features in the above-mentioned embodiments are not described. However, as long as there is no contradiction in the combination of these technical features, it should be regarded as the scope described in this specification.

The above-mentioned embodiments only express several embodiments of the present disclosure, and the description is relatively specific and detailed, but it should not be understood as a limitation on the scope of present disclosure patent. It should be pointed out that for those of ordinary skill in the art, without departing from the concept of the present disclosure, modifications and improvements can be made, and these all fall within the protection scope of the present disclosure. Therefore, the scope of protection of the present disclosure patent should be subject to the appended claims.

The invention claimed is:

1. A steering wheel used in a vehicle, comprising:
   a steering wheel body movably connected with the vehicle, and having an accommodation space;
   a flexible support member, accommodated and fixed in the accommodation space;
   a vibration member connected to the flexible support member for being suspended and supported on the steering wheel body by the flexible support member;
   a vibrator connected to the vibration member for driving the vibration member to vibrate; and
   wherein the gripping part surrounds the support part; at least two vibration members are symmetrically arranged on opposite sides of the gripping part; the flexible support member, vibration member, and vibrator are arranged one by one, respectively; and the vibrators on different sides of the gripping part are independent from each other.

2. The steering wheel as described in claim 1, wherein the vibrator is a vibration motor with at least two different vibration modes.

3. The steering wheel as described in claim 1, wherein the steering wheel body comprises a support part and a gripping part connected to the support part; the gripping part forms the accommodation space, and the vibration member is disposed in the gripping part.

4. The steering wheel as described in claim 1 comprising a concave part formed on a side of the gripping part away from the support part by sinking toward the support part; wherein the vibration member is embedded in the concave part; the vibrator and the flexible support member are accommodated in the concave part and sandwiched between the vibration member and the gripping part; an outer surface of the vibration member smoothly transits to an outer surface of the steering wheel body.

5. The steering wheel as described in claim 4, wherein the gripping part comprises an arched part protruding from the concave part, and a flat part located on opposite sides of the arched part; the arched part and the flat part extend along the circumferential direction of the steering wheel body; the flexible support member is sandwiched between the flat part and the vibration member; and the arched part is sunk in a direction away from the vibration member for forming a groove for accommodating the vibrator.

6. The steering wheel as described in claim 5, wherein the vibration member includes a protruding bump protruding toward a direction of the groove; the protruding bump includes an installation slot, such that the vibrator is fixed in the installation slot and suspended in the groove.

7. The steering wheel as described claim 5, wherein the flexible support member comprises a first support part arranged oppositely and spaced apart, a second support part and a third support part respectively arranged at both ends of the first support part; the first support part is attached to the flat part; the second support part and the third support part are respectively sandwiched between the arched part and the vibration member and are attached to both ends of the vibration member.

8. A steering wheel vibration prompt system, comprising:
 a steering wheel as described in claim 1;
 a sensor device for collecting environmental information; and
 a control device electrically connected to the sensor device and the vibrator, for following the environmental information and driving the vibrator.

9. A vehicle comprising a vehicle body and a steering wheel vibration prompt system as described in claim 8.

\* \* \* \* \*